United States Patent
Park et al.

(10) Patent No.: US 10,685,024 B2
(45) Date of Patent: Jun. 16, 2020

(54) TUPLE EXTRACTION USING DYNAMICALLY GENERATED EXTRACTOR CLASSES

(71) Applicant: Oracle International Corporation, Redwood Shores, CA (US)

(72) Inventors: Hoyong Park, San Jose, CA (US); Prabhu Thukkaram, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 239 days.

(21) Appl. No.: 15/133,449

(22) Filed: Apr. 20, 2016

(65) Prior Publication Data

US 2017/0116283 A1    Apr. 27, 2017

Related U.S. Application Data

(60) Provisional application No. 62/244,469, filed on Oct. 21, 2015.

(51) Int. Cl.
| | | |
|---|---|---|
| *G06F 7/00* | (2006.01) | |
| *G06F 16/2455* | (2019.01) | |
| *G06F 16/25* | (2019.01) | |
| *G06F 17/00* | (2019.01) | |

(52) U.S. Cl.
CPC ...... *G06F 16/24568* (2019.01); *G06F 16/258* (2019.01)

(58) Field of Classification Search
CPC ......... G06F 17/30516; G06F 17/30569; G06F 16/24568; G06F 16/258
See application file for complete search history.

(56) References Cited

U.S. PATENT DOCUMENTS

| | | | |
|---|---|---|---|
| 6,011,916 A | | 1/2000 | Moore et al. |
| 6,076,090 A | * | 6/2000 | Burroughs ........ G06F 17/30607 707/792 |
| 6,523,102 B1 | | 2/2003 | Dye et al. |
| 7,228,550 B1 | * | 6/2007 | Eberhard ................ G06F 9/544 709/231 |
| 8,352,517 B2 | | 1/2013 | Park et al. |
| 8,935,293 B2 | | 1/2015 | Park et al. |
| 2006/0282429 A1 | | 12/2006 | Hernandez-Sherrington et al. |
| 2008/0301256 A1 | | 12/2008 | McWilliams et al. |
| 2009/0070786 A1 | | 3/2009 | Alves et al. |
| 2009/0125495 A1 | * | 5/2009 | Zhang ................. G06F 17/2247 |
| 2010/0058299 A1 | * | 3/2010 | Greene .................. G06F 8/315 717/131 |

(Continued)

FOREIGN PATENT DOCUMENTS

WO    2017111644    6/2017

OTHER PUBLICATIONS

U.S. Appl. No. 12/395,871, Non-Final Office Action dated May 27, 2011, 7 pages.

(Continued)

*Primary Examiner* — Kannan Shanmugasundaram

(74) *Attorney, Agent, or Firm* — Kilpatrick Townsend & Stockton LLP

(57) ABSTRACT

Systems and methods for extracting tuples using dynamically generated extractor classes are disclosed. In some examples, an optimized tuple extraction class can be dynamically generated to enable more efficient tuple extraction.

18 Claims, 9 Drawing Sheets

(56) References Cited

U.S. PATENT DOCUMENTS

| | | | | |
|---|---|---|---|---|
| 2010/0094747 | A1* | 4/2010 | DeAddio | G06Q 20/10 705/37 |
| 2010/0106853 | A1* | 4/2010 | Kashiyama | G06Q 10/06 709/231 |
| 2010/0146243 | A1 | 6/2010 | Balko et al. | |
| 2010/0161627 | A1* | 6/2010 | Vossen | G06F 17/30286 707/755 |
| 2010/0223606 | A1* | 9/2010 | Park | G06F 9/44521 717/166 |
| 2011/0093631 | A1 | 4/2011 | Gerea et al. | |

OTHER PUBLICATIONS

U.S. Appl. No. 12/395,871, Notice of Allowance dated May 4, 2012, 6 pages.

U.S. Appl. No. 12/395,871, Final Office Action dated Oct. 19, 2011, 9 pages.

U.S. Appl. No. 12/395,464, Final Office Action dated May 16, 2014, 16 pages.

U.S. Appl. No. 12/396,464, Final Office Action dated Jan. 16, 2013, 17 pages.

U.S. Appl. No. 12/396,464, Non-Final Office Action dated Dec. 31, 2013, 16 pages.

U.S. Appl. No. 12/396A64, Non-Final Office Action dated Sep. 7, 2012, 18 pages.

U.S. Appl. No. 12/396,464, Notice of Allowance dated Sep. 3, 2014, 7 pages.

"Strings in C," Swarthmore College, retreived from internet: http://web.cs.swarthmore.edu/~newhall/unixhelp/C_strings.html (Jun. 12, 207) 3 pages.

Configuring Custom Adapters, Oracle Fusion Middleware Developer's Guide for Oracle Complex Event Processing, Sep. 7, 2012, 18 pages.

Overview of Creating Oracle CEP Applications, Oracle Fusion Middleware Developer's Guide for Oracle Complex Event Processing, Sep. 8, 2012, 26 pages.

Ozsu et al., Streaming Data and Cloud Computing, Principles of Distributed Database Systems—Chapter 18, Mar. 2, 2011, pp. 723-763.

International Application No. PCT/RU2015/000915, International Search Report and Written Opinion dated Sep. 9, 2016, 11 pages.

International Application No. PCT/RU2015/000915, International Preliminary Report on Patentability dated Jul. 5, 2018, 9 pages.

U.S. Appl. No. 15/973,042, Notice of Allowance dated Aug. 30, 2019, 10 pages.

U.S. Appl. No. 15/973,042, Notice of Allowance dated Aug. 12, 2019, 16 pages.

\* cited by examiner

AlertEntryEvent : TupleEvent name="id" type="char"
name="title" type="char"
name="eventName" type="char"
name="effective" type="char"
name="expires" type="char"
name="msgType" type="char"
name="category" type="char"
name="severity" type="char"
name="areaDesc" type="char"
name="geometry" type="Geometry"

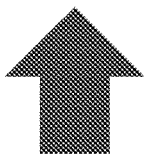

Class AlertFeed {
    List<AlertEntry> alerts;
};
Class AlertEntry {
    String event;
    String id;
    String title;
    String effective;
    String msgType;
    String severity;
    AlertGeocode geocode;
};
Class AlertGeocode {
    List<String> valueNames;
    List<String> values;
};

FIG. 4

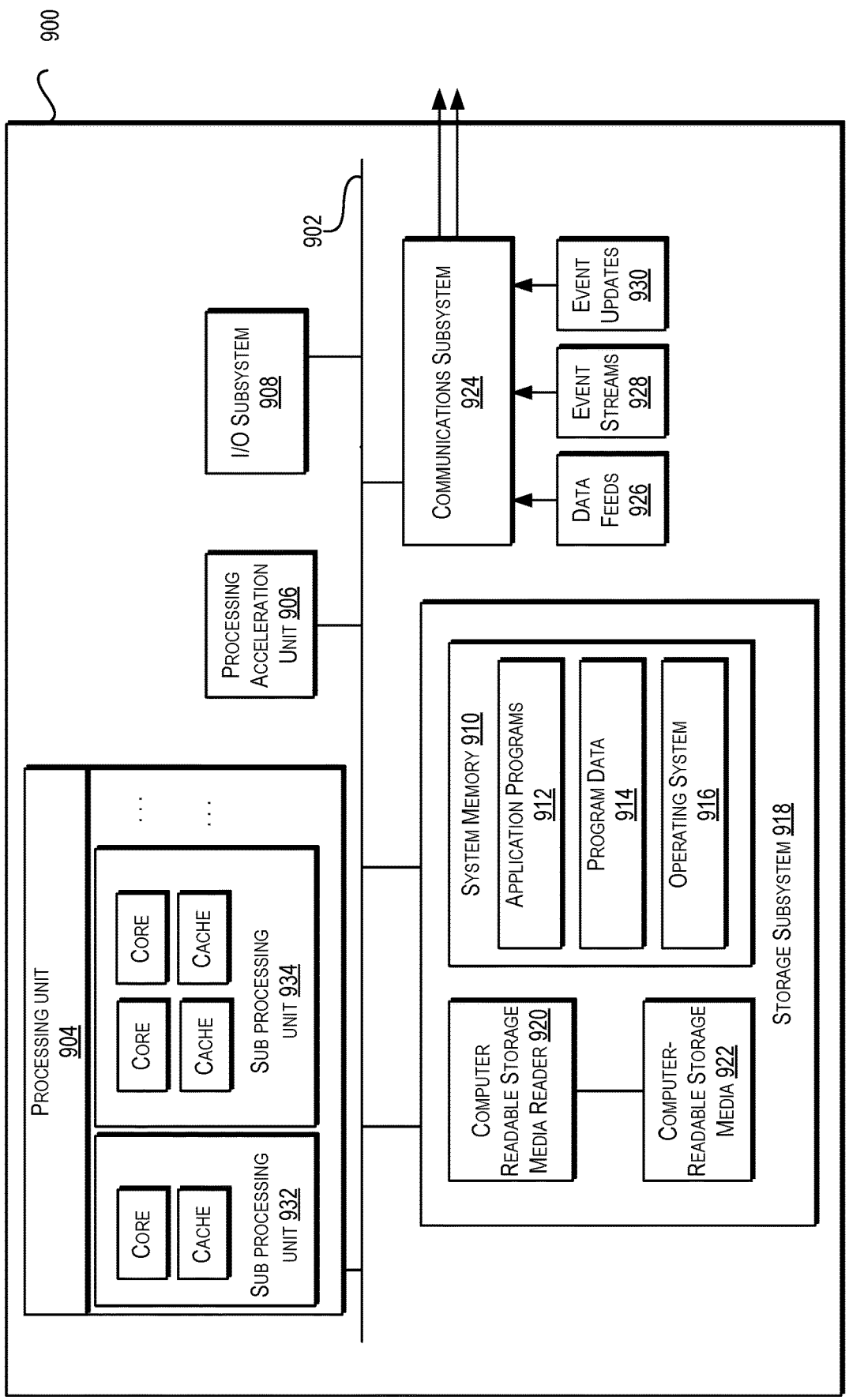

TUPLE EXTRACTION USING DYNAMICALLY GENERATED EXTRACTOR CLASSES

CROSS-REFERENCE TO RELATED APPLICATIONS

The present application is a non-provisional application of, and claims the benefit and priority under 35 U.S.C. 119(e) of U.S. Provisional Application No. 62/244,469, filed Oct. 21, 2015, entitled "TUPLE EXTRACTION USING DYNAMICALLY GENERATED EXTRACTOR CLASSES." This application is also related to U.S. Pat. No. 8,935,293, entitled "FRAMEWORK FOR DYNAMICALLY GENERATING TUPLE AND PAGE CLASSES," filed on Mar. 2, 2009 and issued on Jan. 13, 2015, the entire contents of which are incorporated by reference for all purposes.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

In some examples, a method, a system, and a computer-readable medium may be provided. The method, the system, and/or the computer-readable medium may comprise generating a first extractor for extracting a first field from a first event, determining an output event type, generating a second extractor for extracting subsequent fields from subsequent events based at least in part on the input event type, and implementing the second extractor. In some cases, the first extractor may be implemented to determine an input event type, extract the first field from the first event, and convert the first field to the output event (for the first event). Additionally, in some cases, the second extractor may be implemented to extract a subsequent field from the subsequent event and convert the subsequent field to the output event. In some cases, the first event and the subsequent events may be received from an input stream. The method, system, and/or computer-readable medium may also store the output event as a tuple and/or receive code that identifies a type conversion for each of a plurality of input events. In some examples, the second extractor may not determine a subsequent input event type for the subsequent events. In some examples, the first extractor, may be generated based at least in part on the code and/or the code may be received from an entity associated with at least one of the first event or the subsequent events. In some instances, the second extractor may be implemented for each subsequent event and/or at least one of the first extractor or the second extractor may be implemented as object oriented classes of an adapter framework.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed disclosures, any of the presently described embodiments and/or examples, or the presently understood best mode of any innovations presented within this disclosure.

FIG. 4 is a block diagram that includes example pseudo-code for implementing an embodiment of the present disclosure.

FIG. 9 illustrates an exemplary computer system, in which various embodiments of the present disclosure may be implemented in according with some of the examples described herein, according to at least one example.

DETAILED DESCRIPTION

Figure 1:
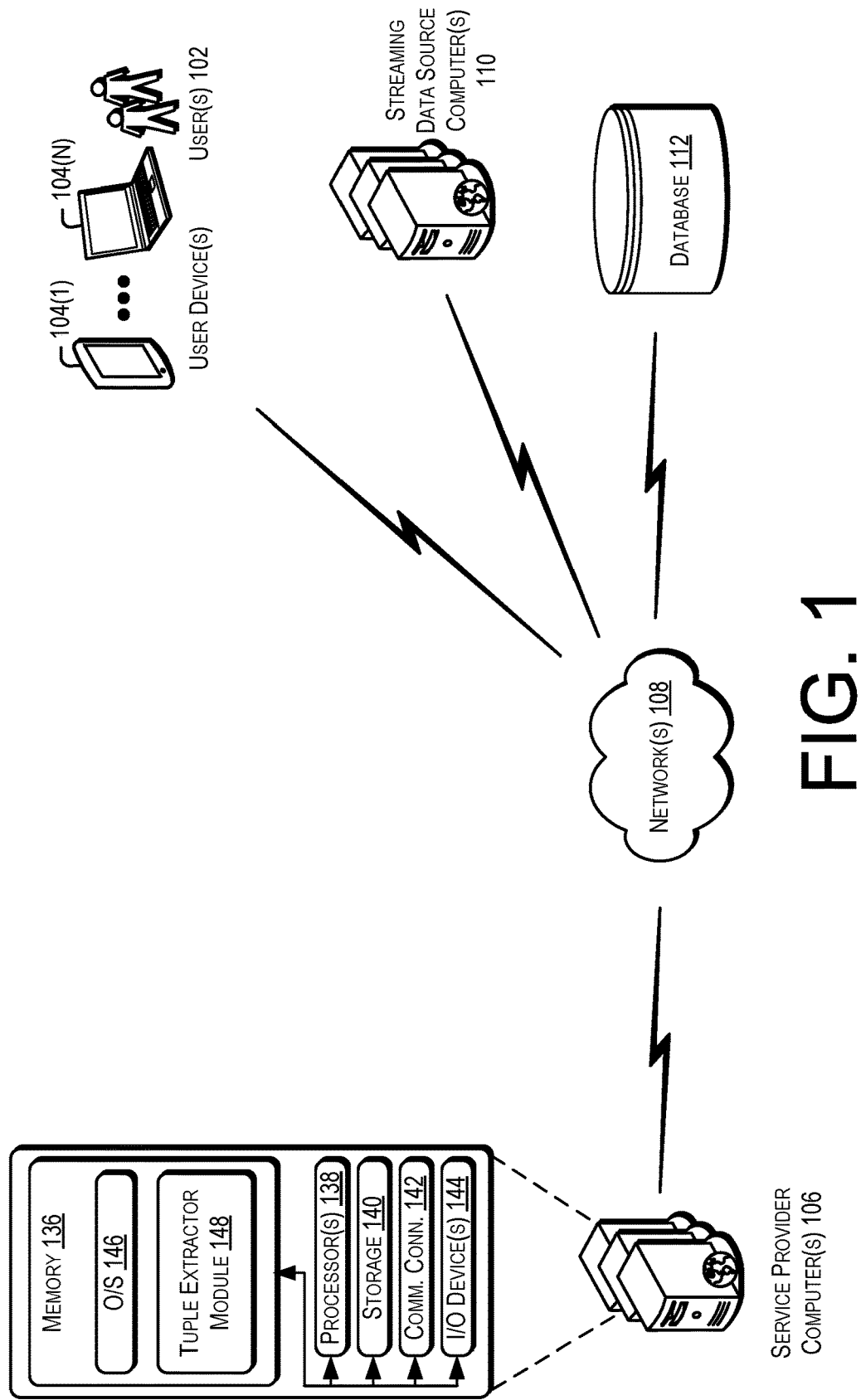
FIG. 1 is a simplified illustration of a system that may incorporate an embodiment of the present disclosure.

In applications such as stock quote monitoring, automobile traffic monitoring, and data sensing, data is generated in the form of a stream of events over time. A data stream, also referred to as an event stream, is a real-time, continuous, sequence of events. Examples of sources that generate data streams include sensors and probes (e.g., radio frequency identification (RFID) sensors, temperature sensors, etc.) configured to send a sequence of sensor readings, financial tickers, network-monitoring and traffic-management applications sending network status, click stream analysis tools, and others. The term "events" are used interchangeably with "tuples." As used herein, tuples of a stream have the same set of attributes but not necessarily the same attribute values for those attributes. Each tuple is also associated with a particular time. A tuple may be considered to be logically similar to a single row or record in a relational database.

An event processing system typically has an adapter layer for ingesting input events to the system. The primary responsibility of the adapter layer is to convert the input event types to tuple types. For converting input event types to tuple types, the fields from the input event type should be extracted and set to tuple types. While extracting the fields, sometimes type conversion is desired. Since the extractor and the type conversion logic needs to handle any combination of inputs, the typical implementation uses type matching logic using if, else, switch, and map along with class types. Since the extraction is done for each input event and the type conversion is done for each field in the input event, the type conversion operation is critical.

A continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<timestamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

```
        . . .
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
        . . .
```

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted above, a stream may be the principle source of data that CQL queries may act on. Additionally, as noted, a stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some examples, a tuple and an event are different terms for the same concept. However, the formats may be different. In some cases, an "event" is the term used for input and output of a stream. An event may be received and/or provided as output of a stream processor. However, the data of the event may be stored in a tuple. As such, a "tuple" may be a CQL engine construct (object) for storing the data of the events. As such, the properties of an event may become the properties of a tuple; however, they may be in a different form. In some examples, the physical form (e.g., the data structure) may be the biggest difference between an event and a tuple. In some examples, the input event or the output event may be tied to the input or output system, respectively. However, a tuple may be a generic type of object that can store the attributes, properties, etc. of the events. In memory, sometimes the tuple may take the form of an array. For example, an event may be received as XML data, which may be parsed and stored in a different form. The XML event may include many different data points (elements), for example, time, stock price, etc. Based at least in part on a CQL statement from a user, only one (or some subset) of the attributes may be stored in an array as the tuple.

In some cases, the CQL engine may not need to know every property of an incoming event. As an example, a stock symbol event may be received. The stock symbol event may include many properties, including: time, stock price, bid price, symbol name, offer price, buy price, etc. However, the tuple may only store some of the values that were selected by the user (e.g., based at least in part on the particular CQL query). As such, only the interesting parts are stored in the tuple.

FIG. 1 depicts a simplified example system or architecture 100 in which techniques for dynamically generated extractor classes may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112 (e.g., queries may be run against either or both of 110, 112). The databases 112 may be relational databases, SQL servers, or the like and may, in some examples, manage historical data, event data, relations, archived relations, or the like on behalf of the users 102. Additionally, the databases 112 may receive or otherwise store data provided by the streaming data source computers 110. In some examples, the users 102 may utilize the user devices 104 to interact with the service provider computers 106 by providing queries (also referred to as "query statements") or other requests for data (e.g., historical event data, streaming event data, etc.). Such queries or requests may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the management of archived relations, configurable data windows associated with archived relations, and/or accurately counting change events associated with managing archived relations described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the identity interface computers 120 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least a tuple extractor module 148. As used herein, modules may refer to programming modules executed by servers or clusters of servers that are part of a service. In this particular context, the modules may be executed by the servers or clusters of servers that are part of the service provider computers 106.

Figure 2:
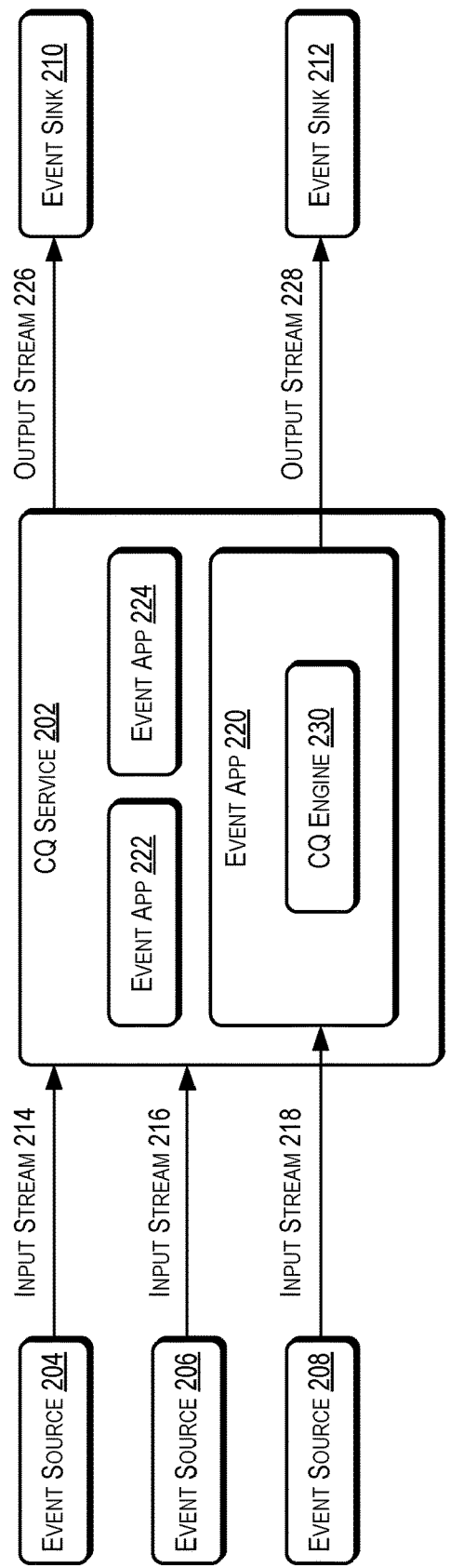
FIG. 2 is a block diagram that may incorporate an embodiment of the present disclosure.

FIG. 2 depicts a simplified high level diagram of an event processing system 200 that may incorporate an embodiment of the present disclosure. Event processing system 200 may comprise one or more event sources (204, 206, 208), an event processing server (EPS) 202 (also referred to as CQ Service 202) that is configured to provide an environment for processing event streams, and one or more event sinks (210, 212). The event sources generate event streams that are received by EPS 202. EPS 202 may receive one or more event streams from one or more event sources. For example, as shown in FIG. 2, EPS 202 receives an input event stream 214 from event source 204, a second input event stream 216 from event source 206, and a third event stream 218 from event source 208. One or more event processing applications (220, 222, and 224) may be deployed on and be executed by EPS 202. An event processing application executed by EPS 202 may be configured to listen to one or more input event streams, process the events received via the one or more event streams based upon processing logic that selects one or more events from the input event streams as notable events. The notable events may then be sent to one or more event sinks (210, 212) in the form of one or more output event streams. For example, in FIG. 2, EPS 202 outputs an output event stream 226 to event sink 210, and a second output event stream 228 to event sink 212. In certain embodiments, event sources, event processing applications, and event sinks are decoupled from each other such that one can add or remove any of these components without causing changes to the other components.

In one embodiment, EPS 202 may be implemented as a Java server comprising a lightweight Java application container, such as one based upon Equinox OSGi, with shared services. In some embodiments, EPS 202 may support ultra-high throughput and microsecond latency for processing events, for example, by using JRockit Real Time. EPS 202 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 2 provides a drilldown for one such event processing application 220. As shown in FIG. 2, event processing application 220 is configured to listen to input event stream 218, execute a query 230 comprising logic for selecting one or more notable events from input event stream 218, and output the selected notable events via output event stream 228 to event sink 212. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 220 in FIG. 2 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 202 without having to store all the received events data. Accordingly, EPS 202 provides a special querying mechanism that enables processing of events to be performed as the events are received by EPS 202 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 202 for a particular event stream may be executed each time that an event is received in that event stream. As part of the continuous query execution, EPS 202 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:
(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.
(2) One or more channels that act as event processing endpoints. Among other things, channels are responsible for queuing event data until the event processing agent can act upon it.
(2) One or more application processors (or event processing agents) are configured to consume normalized event data from a channel, process it using queries to select notable events, and forward (or copy) the selected notable events to an output channel.
(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.
(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 200 depicted in FIG. 2 may have other components than those depicted in FIG. 2. Further, the embodiment shown in FIG. 2 is only one example of a system that may incorporate an embodiment of the present disclosure. In some other embodiments, system 200 may have more or fewer components than shown in FIG. 2, may combine two or more components, or may have a different configuration or arrangement of components. System 200 can be of various types including a personal computer, a portable device (e.g., a mobile telephone or device), a workstation, a network computer, a mainframe, a kiosk, a server, or any other data processing system. In some other embodiments, system 200 may be configured as a distributed system where one or more components of system 200 are distributed across one or more networks in the cloud.

The one or more of the components depicted in FIG. 2 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

1 Dynamically Generated Extractor Class

Figure 3:
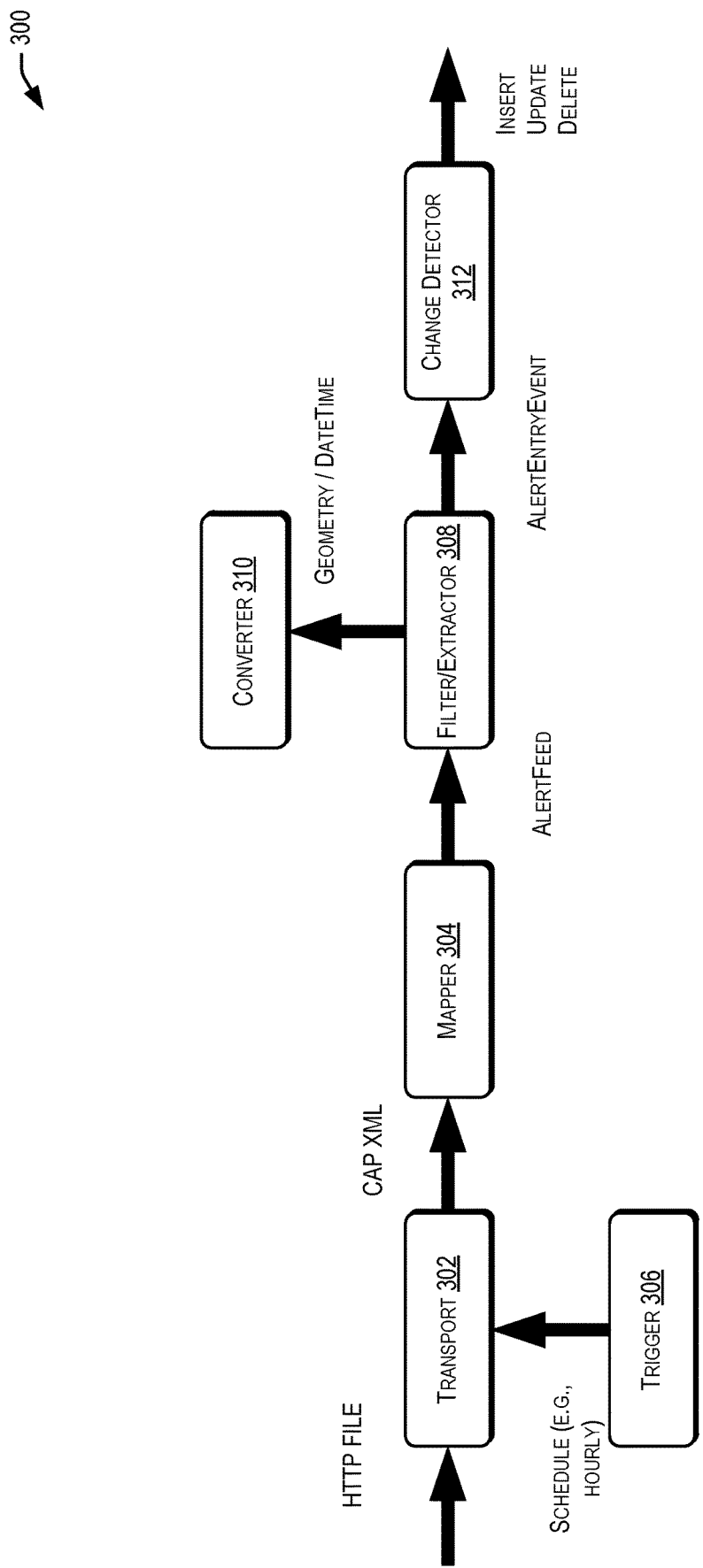
FIG. 3 is a simplified block diagram of details for implementing an embodiment of the present disclosure.

FIG. 3 depicts a simplified diagram of an adapter framework 300 that includes at least the following components: a transport component 302, a mapper component 304, a trigger component 306, a filter component and/or an extractor component 308, a converter component 310, and a change detector component 312.

In some examples, the transport component 302 may be responsible for receiving contents (e.g., events) from a source. The contents may include more than one event. Additionally, the mapper component 304 may be responsible for converting one input type of content to another type that the system understands and generates events. The mapper component may generate the output events directly or create an intermediate java type and use an extractor component. In some example, the Java Architecture for XML Binding (JAXB) may be used in implementing the mapper component 304 and JAXB may generate intermediate java classes that can converted to events by the extractor component 308. In some examples, the trigger component 306 may invoke the transport component 302 to receive content (events) from the source. The trigger component 306 allows control of processing source data logic when and what. It can provide an initial set of the source data and it can schedule extraction of data from the source. In some examples, the adapter 300 only deals with processing data. Thus, it may be desirable to implement a triggerable interface and follow some protocol to invoke the transport component 302 to receive contents. Some embodiments of the trigger components 306 are scheduled trigger, folder monitor trigger, delay loopback trigger, and console input trigger. A scheduled trigger may trigger on a schedule and/or may support "At," "Delay," and "Duration." A folder monitor trigger may monitor folders and send new/updated file paths. A delay loopback trigger may support delay load and/or delay repeat functionality. A console input trigger may retrieve input from a console and may be useful in demo scenarios.

In some examples, the extractor component 308 may be configured to extract fields associated with the output type of the mapper component 304. The extractor component 308 may be implemented based at least in part on a dynamically generated extractor class. Having a specific extractor component 308 can enable adapter-specific extraction. The extractor component 308 can provide simple rules (including "foreach" rules) for extraction and can provide a mapping of properties (e.g., using a converter). The extractor component 308 may work with general Extensible Stylesheet Language Transformation (XSLT) processing. Example rule of 308 includes:

```
foreach(
  AlertEntry:alerts,
  '*';
  geometry=GeomConverter(polygon,AlertGeocode:
  geocode/valueNames,AlertGeocode:geocode/values')
```

That is, for each AlertEntry type in alerts of AlertFeed, the extractor component may copy all properties but polygon, valueNames of geocode property Of AlertGeocodeType, values of geocode property Of AlertGeocodeType passed to GeomConverter which creates a Geometry type and assign it to geometry.

In some examples, the filter component 308 may be configured to filter events based at least in part on fields of the events. The filter component 308 may be configured to filter based at least in part on event property. The filter component 308 can support inclusion or can easily be expanded to general Boolean expression. The filter component 308 and the extractor component 308 may be configured as two separate components or as a single component that both extracts and filters.

In some examples, a converter component 310 may be configured to convert types of fields. For example, property types may be automatically converted for built-in types. Some geometry types may require more treatment. For example, they may be spread into multiple properties, they may be complex type such as Extensible Markup Language (XML) or JavaScript Object Notation (JSON), and/or they may need geocode handling. In some examples, a geometry converter may be configured for receiving weather data or the like. The arguments may include a list of geocode names, a list of geocode values, and an optional list of longitude/latitude pairs. For each geocode name/value, the adapter may decode the geocode and get polygon data from a geocode database. Then, the geometry converter may return a list of geometries corresponding to the geocode name/value pairs.

In some examples, a change detector component 312 may be configured to detect changes in contents/events received by the custom adapter. The change detector component 312 may detect changes of input contents/events and send events of insert/update/delete kinds. In some examples, the change detector component 312 may only work with Relation-type data; however, in other examples, it may work with all data types. The change detector component 312 may be useful for working with sending updates from the same datasource (e.g., RSS). In some examples, the Key column from one of fields of tuples required in order to detect insert/update/delete kinds. One embodiment of change detection component is using a hash table datastructure where the old events are stored in the hash table and the Key column is to detect insert/update/delete kinds. Using a map change detection component, the system may handle auto expiration from the time specified in the event.

In many examples, systems that process data from a stream may provide an adapter 300 or allow customers to write their own adapter code to be used in the ingestion system. But, most adapter frameworks don't have many APIs, or they only deal with the transport layer. Meaning, the APIs may only be used for instructing the adapter on where to read the data from. Some more advanced adapters may be configured with APIs for mapping the data. However, the flexible event ingestion framework described herein can allow for APIs that can be configured to execute or control several other event ingestion components, some of which have been described above.

In one example, in order to handle an RSS data source, it may be helpful to be able to schedule pulling the data and convert the data into a particular form (e.g., XML). Sometimes, it may be helpful to extract the some parts of the content into an appropriate event format. Additionally, RSS content may have a timestamp or time mark, which can enable the event ingestion system to determine which data points are relevant (e.g., it may not be helpful to process data that is outdated). By having this construct, it is possible to mix and match different components as needed to flexibly configure the adapter framework to meet particular needs. For example, a Comma Separated Values (CSV) adapter may read a CSV file and then convert the CSV format to a tuple format. Similarly, for JavaScript Object Notation (JSON) files, a JSON adapter may read the JSON file and then convert to a tuple format. But, that basically involves two parts already because the CSV file is part of the transport but CSV is more like a mapper area. So, if it's separated out so the file is at the transport, then components can be mixed and matched for different formats so the transport and mapper are separated out (e.g., so that the same code doesn't need to be rewritten). Similarly, for the trigger, the trigger may be configured as a mechanism that triggers the transport (e.g., an HTTP transport) to read something (e.g., an HTTP file) every particular duration. Alternatively, the trigger may also be configured to monitor the source and identify when the file is new, and trigger the transport to read the new file. The trigger may also be activated by a user (e.g., selecting a read of an input source from a console or other UI).

In some examples, the change detector component 312 may be configured as a content change detector and may actually be located between the transport component 302 and the mapper component 304. This change detector (e.g., the content change detector) may identity when data extracted by the transport component 302 was generated and/or received (e.g., based on its timestamp or other metadata). Another type of change detector (e.g., a tuple-level change detector), however, may be implemented on top of each individual tuple. For example, for each individual tuple, a hash table may be maintained on top of the tuples. Then, using a key-value comparison, the content change detector can identify whether the value of the tuple has changed for the same ID (key). Further, in some examples, the trigger component 306 may be configured to trigger the transport component 302 to read new data based at least in part on a change detected by the change detector 312. The mix-and-match capabilities of these components make the adapter more flexible because none of the code is built into the adapter. Thus, a trigger component 306 written for one particular adapter (e.g., an RSS adapter) may later be used within a JSON adapter without having to write new code for the adapter. Instead, an API method call may be made by the adapter to implement the trigger component 306 regardless of the type of adapter being used and/or the type of the data being received from the source. For example, a file adapter may include a JSON mapper. Using that, an incoming JSON file can be written to the system. Later on, if the system wants to monitor (e.g., every hour) and check if the JSON file has changed, the adapter configuration and/or application configuration can be changed to add a scheduled trigger with a content change detector. Thus, the behavior is extended without rewriting the adapter.

To avoid type conversion at runtime, a dynamically generated extractor class may be utilized to extract tuples from incoming events. In some examples, a programmer may write some code (e.g., in Java or other object oriented language), including some classes, framework, etc. Additionally, there is something in Java called bytecode manipulation, where a programmer can create a dynamic class for a virtual machine. Events may be received as XML code or in Java. After converting the XML portion to Java classes, the system may be left with entries of a class. For example, the following pseudocode may represent a hierarchical form of classes "AlertFeed" and "AlertEntry":

```
Class AlertFeed {
    List<AlertEntry> alerts;
}
Class AlertEntry {
    String event;
    String id;
    String title;
    String effective;
    String msgType;
    String severity;
    AlertGeocode geocode;
}
Class AlertGeocode {
    List<String> valueNames;
    List<String> values;
}
```

This pseudocode may be considered hierarchical at least because each class could be represented as a tree node, with branches represented by the entries and/or attributes of each class. In some examples, these classes can be flattened to tuples based at least in part on the attributes that the user desires to track (e.g., the attributes being requested by the query). In order to do that, each alert entry from the "AlertFeed" class can be analyzed and the system can extract each field (e.g., event, id, title, etc.) while converting the "AlertGeocode" class into the "geometry" format. Essentially, the extractor reads from one event type, and then create a new event type. Essentially, taking the Java class pseudocode and converting it into tuples. The following pseudocode can be used to do the flattening. In some cases, the following pseudocode may be received from a user or developer that is designing the CQL query:

```
foreach(
AlertEntry:alerts,
'*;
geometry=GeomConverter(polygon,AlertGeocode:geocode/
valueNames,AlertGeocode:geocode/values)
```

As noted above, this pseudocode may include copying, for each AlertEntry type in alerts of AlertFeed, all properties but polygon, valueNames of geocode property Of AlertGeocodeType, values of geocode property Of AlertGeocode-Type passed to GeomConverter which creates a Geometry type and assign it to geometry. Per the rule in the "foreach" statement (e.g., the use of the "*" indicates to copy everything except the "geometry" type), the "AlertGeocode" type will be converted to the "geometry" type. Thus, the resulting (flattened) set of tuples (object) may correspond to the following additional pseudocode that is not hierarchal in nature, but has the event types converted appropriately:

```
AlertEntryEvent : TupleEvent
    name="id" type="char"
    name="title" type="char"
    name="eventName" type="char"
    name="effective" type="char"
    name="expires" type="char"
    name="msgType" type="char"
    name="category" type="char"
    name="severity" type="char"
    name="areaDesc" type="char"
    name="geometry" type="Geometry
```

For each input event, a field (property) from each event is extracted, and the type is converted to the type of the output event field (property), and then set the property to the output event. FIG. 4 illustrates an example mapping from the original pseudocode noted above (hierarchical event data) to the flattened tuple data. In some examples, String in XML (e.g., from the event) may be converted to "char" in the tuple, Int may be converted to "int," Double to "double," Boolean to "boolean," etc. These conversions may be included in a table and/or may be a built-in type conversion. If the conversion is not in the table, the system may need to reference the code received from the user. Some type conversions require special treatment (e.g., timestamp and/or geometry). The extractor component performs each individual extraction, and calls the converter component to convert the type of each event.

In some cases, using the rule that the developer (or stream explorer (SX)) has provided, the extractor will go through each event and extract the field from the input event. This may only occur for standard event types, though, as opposed to those that need special treatment (e.g., timestamp and/or geometry). Because the system does not know the input type, but the output type is defined by the code received from the developer (or user, or SX), some converter code should be used to perform conversions when necessitate. For example, if the input type is Int, and the output type is "int," then no conversion will be needed. However, if the input type is String, and the output type is "int," then some conversion may be needed. The code will check each input type, and have an output for that input type that converts to the desired output type. Once the conversion is complete, the system can determine what input type was used based at least in part on which step of the "if/else" statement was executed. Using this input type, a new extractor class can be generated that handles conversion from that input type to the defined output type. Thus, for the rest of the events of the input object, the new (dynamically generated) extractor class can be used. Below, the new extractor class is called the "Optimized Field Extractor."

Extractor
    Adapter specific extraction
    Provides Very Simple Rule
        Foreach
        Mapping of properties
            Use converter
            Also works with general XSLT processing XSLT processing is also added
Extractor Optimization
  For each input events
    1. Extract fields from input event
    2. Convert type to output event field
    3. Set to output event
    4. Extract fields and converting type operation is performed for each fields→bottleneck of performance
    5. Optimize Extract Field
    6. Looping of field can be removed by loop unrolling
Typical Field Extractors
  Converting input field to integer value (e.g output field type is integer)

```
public int ExtractField1(Object v)
{
  If (v instance of Integer) return ((Integer)v);
  else If (v instance of Number) return ((Number)v).intValue( );
  else if (v instance of String) return Integer.parseInt((String)v)
  else new RuntimeException("failed to convert")
}
```

The adapter framework needs to handle generic input event type. Do not know the input field types before runtime, so the system would need to repeatedly perform type checking for every possible case.
Optimized Field Extractor

```
public final int ExtractField1Int(String v)
{
  return Integer.parseInt(v);
}
```

After the first extraction, we know the first field is String type and we are converting String to Integer.
  We can omit type checking and other if clauses
  We can optimize further by inlining the function directly, but Java JIT will also convert the methods with 'final' to inline functions
Optimized Extractor

```
public class ExtractorXX
{
  EventType inputEvent, outputEvent;
  EventProperty inputField1, inputField2, . . . ;
  EventProperty outputField1, outputField2, . . . ;
  //Field extractors
  public int ExtractField1Int(Object v) { }
  public String ExtractField2String(Object v) { }
  ...
public Object extract(Object event)
  {
    Object outputEvent = outputEventType.createEvent( );
    outputField1.set(outputEvent, ExtractField1Int(inputField1.get
    (event)));
    outputField2.set(outputEvent, ExtractField2String(inputField2.get
    (event)));
    ...
    return outputEvent; } }
```

The solution is built within the extractor component 308 of FIG. 3 (e.g., a CEP Adapter Framework 300). The extractor component extracts fields from input events and sets them to the newly created output tuples. The extractor has the following specifications:
  Input event type
  Output tuple type
  Array of field names and types from input event type
  Array of field names and types from output event type
  Map of input field names to output field names
  Further, a simplified explanation of the process could be described with the following:
  Receive the input event
  Determine the extractor specification
  Generate extractor class
  Load the extractor class in a virtual machine
  Instantiate the extractor object
  Use extractor object to extract the fields
  To determine the extractor specification, the initial extraction is performed while creating extractor metadata. The extractor metadata contains the list of extraction rules where each rule includes input event type, input field name, input field type, output event type, output field name, and output field type. The skeleton of dynamically generated extractor class body looks like the following:

```
public class ExtractorXX
{
  EventType inputEvent, outputEvent;
  EventProperty inputField1, inputField2, . . . ;
  EventProperty outputField1, outputField2, . . . ;
  //Field extractors
  public int ExtractField1Int(Object v) { }
  public String ExtractField2String(Object v) { }
  ...
  public Object extract(Object event)
  {
    Object outputEvent = outputEventType.createEvent( );
    outputField1.set(outputEvent, ExtractField1Int(inputField1.get
    (event)));
    outputField2.set(outputEvent, ExtractField2String(inputField2.get
    (event)));
    ...
    return outputEvent;
  }
}
```

Creating field extractors are described below. Typical type conversion code for converting input field to integer value looks like the following:

```
public int ExtractField1(Object v)
{
  If (v instance of Integer) return ((Integer)v);
  else If (v instance of Number) return ((Number)v).intValue();
  else if (v instance of String) return Integer.parseInt((String)v)
  else new RuntimeException("failed to convert")
}
```

Since the input type has already been identified, the type of input type doesn't need to be checked anymore, and an integer extraction method can be created as follows (if String is identified type):

```
public final int ExtractField1Int(String v)
{
  return Integer.parseInt(v);
}
```

The techniques described above and below may be implemented in a number of ways and in a number of contexts. Several example implementations and contexts are provided with reference to the following figures, as described below in more detail. However, the following implementations and contexts are but a few of many.

Figure 5:
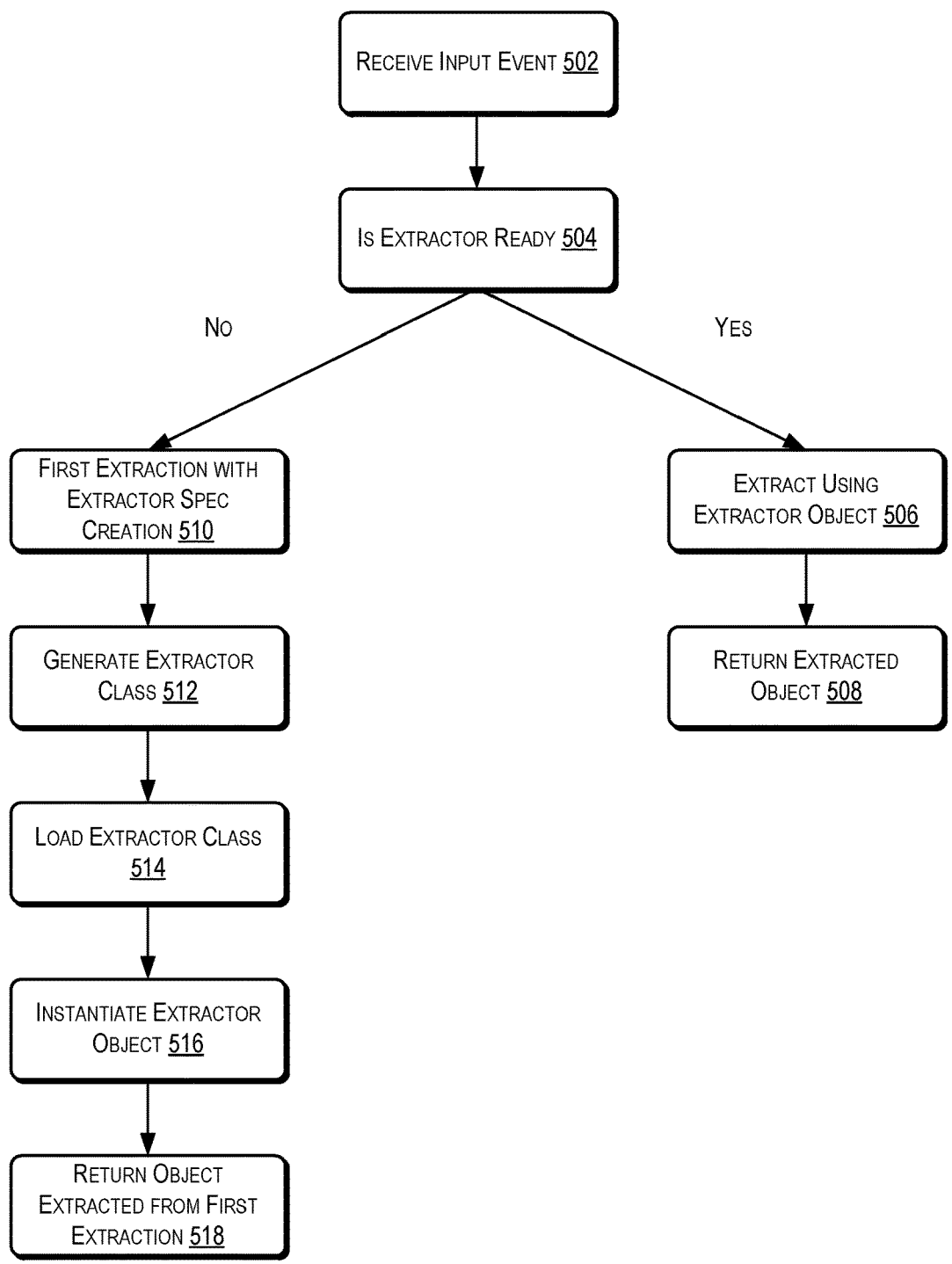
FIG. 5 is a flowchart of a method for implementing an embodiment of the present disclosure.
Figure 6:
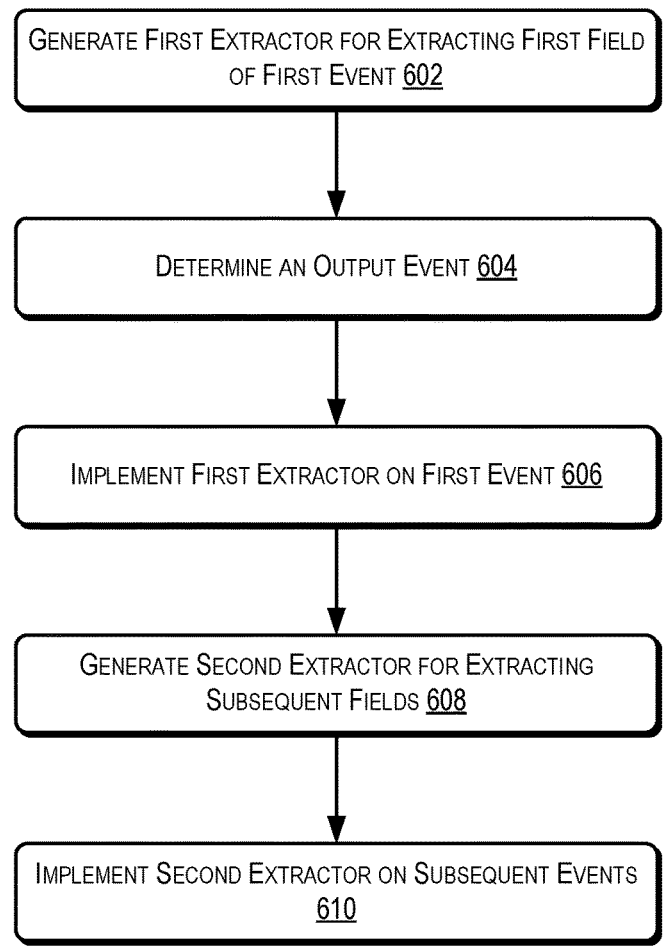
FIG. 6 is a flowchart of a method for implementing an embodiment of the present disclosure.

FIGS. 5 and 6 are flow diagrams of processes for implementing a dynamic extractor class in accordance with at least some embodiments. These processes 500 and 600 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the tuple extraction module 148 shown in FIG. 1 may perform the processes 500 of FIG. 5. In FIG. 5 the process 500 may include receiving an input event at 502. The input event may include business intelligence information or other information from a stream of events. At 504, the process 500 may include determining whether an extractor component (e.g., the extractor component 308 of the adapter of FIG. 3) is ready. If the extractor component is ready at 504, the process 500 may include extracting tuples from the events using the extractor component at 506. Further, the process 500 may then end at 508, where the process 500 may include returning the extracted object.

However, in some cases, if the extractor is not ready at 504, the process 500 may include performing a first extraction with an extractor spec creation (e.g., the first extraction may be performed with a standard extractor class that performs type checking) at 510. At 512, the process 500 may include generating a dynamic extractor class based at least in part on the type of the first extraction. At 514, the process 500 may include loading the dynamically generated extractor class. The process 500 may then include instantiating the new extractor class at 516. The process 500 may end at 518, where the process 500 may include returning an object extracted from the first extraction and/or subsequent extractions.

In some examples, the one or more service provider computers 106 (e.g., utilizing at least the tuple extraction module 148 shown in FIG. 1 may perform the processes 600 of FIG. 6. In FIG. 6 the process 600 may include generating a first extractor class for extracting a first field from a first event of an input stream at 602. At 604, the process 600 may include determining an output event for the event. In some cases, the process 600 may include implementing the first extractor for the first event of the input stream at 606. This implementation may include determining an input event type, extracting the first field from the first event, and converting the first field to the output event. Additionally, at 608, the process 600 may include generating a second extractor for extracting subsequent fields of the input event. The process 600 may end at 610, where the process 600 may include extracting subsequent fields from subsequent events using the second extractor and/or converting the subsequent fields (e.g., after being extracted) to the output event that was determined previously.

Illustrative methods and systems for implementing dynamically generated extractor classes are described above. Some or all of these systems and methods may, but need not, be implemented at least partially by architectures and processes such as those shown at least in FIGS. 1-6 above.

Figure 7:
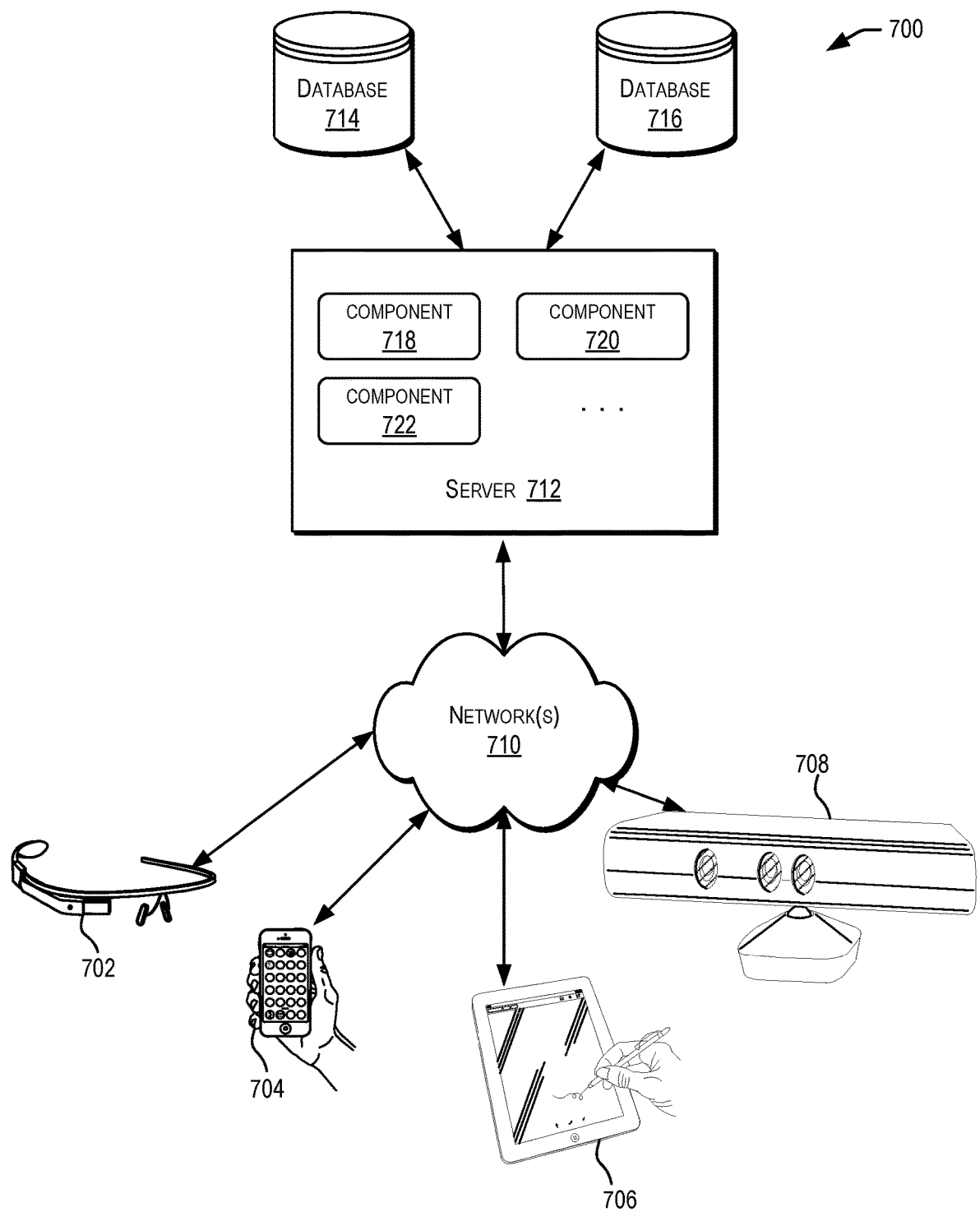
FIG. 7 depicts a simplified diagram of a distributed system for implementing some of the examples described herein, according to at least one example.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 702.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
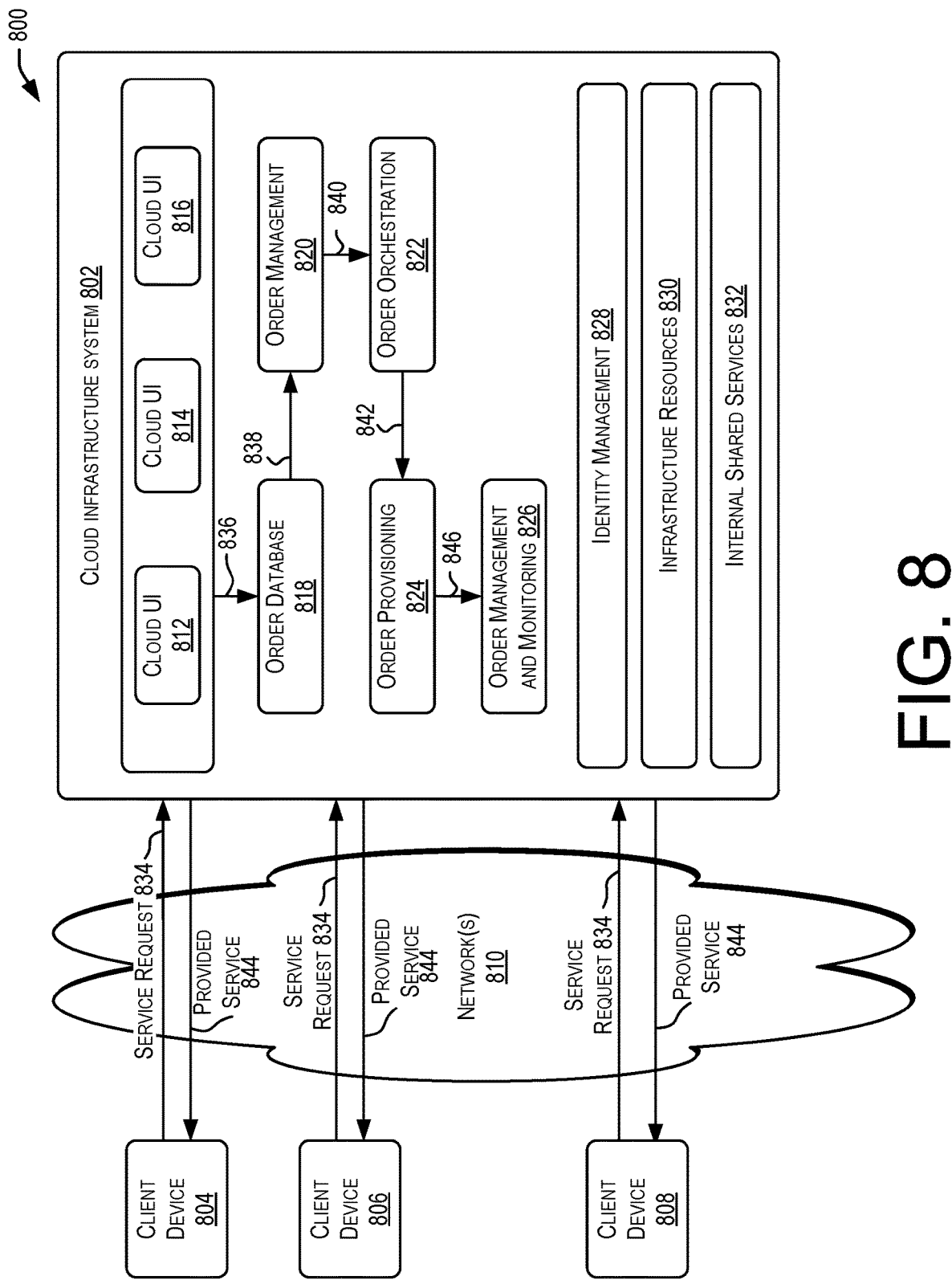
FIG. 8 is a simplified block diagram of components of a system environment by which services provided by the components of an embodiment system may be offered as cloud services, in accordance with some of the examples described herein, according to at least one example.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 602, 604, 606, and 608.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 610.

Cloud infrastructure system 802 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

'Big data' can be hosted and/or manipulated by the infrastructure system on many levels and at different scales. Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

FIG. 9 illustrates an exemplary computer system 900, in which various embodiments of the present disclosure may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 9 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    receiving code that identifies a type of conversion to an output event type for each of a plurality of input event types;
    determining that a first extraction is to be performed for a first event of a new event type, the first extraction flattening an object oriented class into a tuple;
    generating, based at least in part on a generic extractor class configured to receive a generic input type, a first extractor class for extracting a first field from the first event (a) based at least in part on the generic extractor class and the received code and (b) comprising executing, according to the input event type of the first field, a first step of a conditional statement of the code;
    for the first event, implementing the first extractor class to:
        determine, based at least in part on a first type conversion to the output event type, an input event type associated with the first field;
        extract the first field from the first event; and
        convert the first field to the output event type;
    generating the dynamic extractor class for extracting subsequent fields from subsequent events, the dynamic extractor class comprising a subset of instructions from the generic extractor class, the subset of instructions associated with the input event type determined by the first extractor class, the dynamic extractor class generated by:
        determining the first step of the conditional statement of the code; and
        optimizing the generic extractor class to obtain the dynamic extractor class, the dynamic extractor class performing a type conversion equivalent to the first step of the conditional statement of the code;
    instantiating the dynamic extractor class;
    extracting, via the dynamic extractor class, a subsequent field of the input event type determined by the first extractor class from a subsequent event of the new event type, the subsequent event directly following the first event; and
    converting, via the dynamic extractor class, the subsequent field from the input event type determined by the first extractor class to the output event type.

2. The method of claim 1, wherein the first event and the subsequent events are received from an input stream.

3. The method of claim 1, further comprising storing the output event as a tuple.

4. The method of claim 1, wherein the dynamic extractor class converts the subsequent field to the output event, based at least in part on the determined input event type, without determining a subsequent input event type for the subsequent events.

5. The method of claim 1, wherein:
    the first extractor class comprises the code; and
    the conditional statement comprises a type checking conditional statement.

6. The method of claim 1, wherein the code is received from an entity associated with at least one of the first event or the subsequent events.

7. The method of claim 1, wherein the dynamic extractor class is used to extract a subsequent field of the input event type for each subsequent event.

8. The method of claim 1, wherein at least one of the first extractor class or the dynamic extractor class are implemented as object oriented classes of an adapter framework, and wherein the object oriented classes of the adapter framework convert the input event type to a normalized tuple type.

9. The method of claim 1, wherein the dynamic extractor class is configured via bytecode manipulation to extract tuples from subsequent events of the determined input event type.

10. The method of claim 1, wherein:
    determining the input event type further comprises creating extractor metadata, the extractor metadata comprising an extraction rule, the extraction rule further comprising an input field type and an output field type; and
    generating the dynamic extractor class comprising the subset of instructions associated with the input event type is based at least in part on the extractor metadata.

11. A system, comprising:
    memory storing computer-executable instructions; and
    one or more processors configured to access the memory and perform the computer-executable instructions to at least:
        receive code that identifies a type of conversion to an output event type for each of a plurality of input event types;
        determine that a first extraction is to be performed for a first event of a new event type, the first extraction flattening an object oriented class into a tuple;
        generate, based at least in part on a generic extractor class configured to receive a generic input type, a first extractor class for extracting a first field from the first event of an input stream (a) based at least in part on the generic extractor class and the received code and (b) comprising executing, according to the input event type of the first field, a first step of a conditional statement of the code;
        for the first event of the input stream, implement the first extractor class to:
            determine, based at least in part on a first type conversion to the output event type, an input event type associated with the first field;
            extract the first field from the first event of the input stream; and
            convert the first field to the output event type;
        generate the dynamic extractor class for extracting subsequent fields from subsequent events of the input stream, the dynamic extractor class comprising a subset of instructions from the generic extractor class, the subset of instructions associated with the input event type determined by the first extractor class, the dynamic extractor class generated by:
            determining the first step of the conditional statement of the code; and
            optimizing the generic extractor class to obtain the dynamic extractor class, the dynamic extractor class performing a type conversion equivalent to the first step of the conditional statement of the code;

instantiate the dynamic extractor class;

extract, via the dynamic extractor class, a subsequent field of the input event type determined by the first extractor class from a subsequent event of the new event type, the subsequent event directly following the first event in the input stream; and convert, via the dynamic extractor class, the subsequent field from the input event type determined by the first extractor class to the output event type.

12. The system of claim 11, wherein the dynamic extractor class converts the subsequent field to the output event, based at least in part on the determined input event type, without determining a subsequent input event type for the subsequent events.

13. The system of claim 11, wherein:
the first extractor class comprises the code; and
the conditional statement comprises a type checking conditional statement.

14. The system of claim 11, wherein the code is received from an entity associated with at least one of the first event or the subsequent events.

15. One or more non-transitory computer-readable storage medium, storing computer-executable instructions that, when executed by a computer system, configure the computer system to perform operations comprising:

determining that a first extraction is to be performed for a first event of a new event type, the first extraction flattening an object oriented class into a tuple;

receiving, from a user interface, code that identifies a type conversion to an output event type for each of a plurality of input event types;

generating, based at least in part on a generic extractor class configured to receive a generic input type, a first extractor class for extracting a first field from the first event (a) based at least in part on the generic extractor class and the received code and (b) comprising executing, according to the input event type of the first field, a first step of a conditional statement of the code;

for the first event, implementing the first extractor class to:

determine, based at least in part on a first type conversion to the output event type, an input event type of the plurality of input event types, the input event type associated with the first field;

extract the first field from the first event; and convert the first field to the output event type based at least in part on the first type conversion;

generating the dynamic extractor class for extracting a second field from a second event, the dynamic extractor class comprising a subset of instructions from the generic extractor class, the subset of instructions associated with the input event type determined by the first extractor class, the dynamic extractor class generated by:

determining the first step of the conditional statement of the code; and optimizing the generic extractor class to obtain the dynamic extractor class, the dynamic extractor class performing a type conversion equivalent to the first step of the conditional statement of the code;

instantiating the dynamic extractor class;

extracting, via the dynamic extractor class, a second field of the input event type determined by the first extractor class from the second event, the second event of the new event type and directly following the first event; and converting, via the dynamic extractor class, the second field from the input event type determined by the first extractor class to the output event type based at least in part on the code that identifies the type conversion.

16. The one or more non-transitory computer-readable storage medium of claim 15, wherein the first event and the second event are received from an input stream.

17. The one or more non-transitory computer-readable storage medium of claim 15, wherein the dynamic extractor class converts the subsequent field to the output event, based at least in part on the determined input event type, without determining a second input event type for the second event.

18. The one or more non-transitory computer-readable storage medium of claim 15, wherein:
the first extractor class comprises the code; and
the conditional statement comprises a type checking conditional statement.

* * * * *